United States Patent
Iwanaga

(10) Patent No.: US 8,311,316 B2
(45) Date of Patent: Nov. 13, 2012

(54) DEFECT INSPECTING METHOD, DEFECT INSPECTING APPARATUS, AND STORAGE MEDIUM STORING DEFECT INSPECTION PROGRAM

(75) Inventor: Shuji Iwanaga, Koshi (JP)

(73) Assignee: Tokyo Electron Limited, Minato-Ku (JP)

( * ) Notice: Subject to any disclaimer, the term of this patent is extended or adjusted under 35 U.S.C. 154(b) by 410 days.

(21) Appl. No.: 12/762,436

(22) Filed: Apr. 19, 2010

(65) Prior Publication Data

US 2010/0266195 A1 Oct. 21, 2010

(30) Foreign Application Priority Data

Apr. 21, 2009 (JP) ................................. 2009-102619

(51) Int. Cl.
*G06K 9/00* (2006.01)
*G01J 1/10* (2006.01)
*G01J 3/46* (2006.01)

(52) U.S. Cl. ........ 382/149; 382/145; 382/152; 356/402; 356/243.5

(58) Field of Classification Search .......... 382/141–152; 356/237.1–241.6, 242.1–243.8, 426–431, 356/600–640
See application file for complete search history.

(56) References Cited

U.S. PATENT DOCUMENTS

| | | | |
|---|---|---|---|
| 5,966,205 A * | 10/1999 | Jung et al. | 356/71 |
| 6,239,868 B1 * | 5/2001 | Jung et al. | 356/73 |
| 6,546,308 B2 * | 4/2003 | Takagi et al. | 700/121 |
| 6,866,972 B2 * | 3/2005 | Ishino | 430/7 |
| 6,934,050 B2 * | 8/2005 | Merrill et al. | 358/1.16 |
| 7,256,883 B2 * | 8/2007 | Detinkin et al. | 356/237.1 |
| 7,652,276 B2 | 1/2010 | Hayakawa et al. | |

FOREIGN PATENT DOCUMENTS

JP 2007-240519 A1 9/2007

* cited by examiner

*Primary Examiner* — Layla Lauchman
*Assistant Examiner* — Jarreas C Underwood
(74) *Attorney, Agent, or Firm* — Burr & Brown

(57) ABSTRACT

There is provided a database storing reference data including a plurality of reference image data, which are obtained by imaging reference substrates, respectively, wherein each of the reference substrates lacks only one of the films of different kinds but includes remainder of the films of different kinds, and wherein in the reference substrates the lacking films are different from each other, and wherein the plurality of reference image data is classified into categories according to the kinds of the films. Difference degrees between color information of a defect area extracted from an image data of an inspection target substrate and color information of corresponding areas of the reference substrates are calculated. Based on the difference degree, the defective film is identified.

6 Claims, 5 Drawing Sheets

DEFECT INSPECTING METHOD, DEFECT INSPECTING APPARATUS, AND STORAGE MEDIUM STORING DEFECT INSPECTION PROGRAM

FIELD OF THE INVENTION

The present invention relates to a defect inspecting method, a defect inspecting apparatus, and a storage medium storing a defect inspecting program, for inspecting a defect on a substrate to be processed such as a semiconductor wafer.

BACKGROUND ART

A photolithographic process in a manufacture of a semiconductor device includes a resist coating step that forms a resist film on the surface of a semiconductor wafer, an exposing step that exposes the resist-coated semiconductor wafer with a predetermined pattern, and a developing step that develops the exposed resist. The substrate, which has been subjected to the series of process steps, is then subjected to a macro defect inspection in which the substrate is inspected by an inspecting apparatus that inspects whether or not a predetermined film has been suitably formed on the surface of the substrate, whether or not the substrate has been suitably exposed, and whether or not there are damages or particles on the substrate.

As described in JP2007-240519A, in the macro defect inspection, an imaging device such as a CCD line sensor is relatively moved with respect to a stage on which a substrate is placed, and the substrate is imaged by the imaging device. Then, by processing the image, whether any defect exists or not is judged.

In one photolithographic process, on a semiconductor wafer W shown in FIG. 6($a$), a base film 50 (FIG. 6($b$)) is formed, then on which a resist film 51 (FIG. 6($b$)) is formed, and then on which a top coat film 52 (FIG. 6($d$)) is formed, whereby a stacked layer structure is formed. When the macro defect inspection is performed before the exposing step, the surface of the wafer W having thereon multiple films is imaged, from above, by an imaging device such as a CCD camera, thereby obtaining image data D as shown in FIG. 7. The obtained image data D is subjected to image data processing, whereby a defect 60 is detected.

However, in the micro defect inspection, even thought the defect 60 can be detected based on the image data D, it is impossible to determine which film among the base film 50, the resist film 51 and the top coat film 52 has the defect 60. Thus, it takes a lot of time to judge whether the defect is critical or not and to find out a cause of the defect, resulting in serious adverse affect on the productivity.

SUMMARY OF THE INVENTION

The present invention provides a defect inspecting method, a defect inspecting apparatus, and a storage medium storing defect inspection program, which are capable of, in a defect inspection for detecting a defect that is caused during film forming steps to a substrate, identifying a film having the defect.

According to a first aspect of the present invention, there is provided a detect inspecting method of inspecting an inspection target substrate on which a plurality of films of different kinds are stacked on layers, said method comprising: providing a database storing reference data including a plurality of reference image data, which are obtained by imaging a plurality of reference substrates, respectively, wherein each of said reference substrates lacks only one of said plurality of films of different kinds but includes remainder of said plurality of films of different kinds, and wherein in said reference substrates the lacking films are different from each other, and wherein said plurality of reference image data is classified into categories according to the kinds of the films; imaging an inspection target substrate on which the different kinds of films are stacked on layers, thereby obtaining inspection image data; detecting whether or not any defect exists on the inspection target substrate based on the inspection image data; if a defect exists, extracting color information, of an area containing the defect, from the inspection image data, as color values represented according to a color system; extracting color information of an area, corresponding to the area where the defect exists in the inspection target substrate, from each of said plurality of reference image data, as color values represented according to said color system; calculating a difference degree between the color values of the area of the inspection target substrate and the color values of each of the areas of said plurality of reference image data; and judging that a defect exists in one specific film of said plurality of films of different kinds, if the difference degree between the color values of the area of the inspection target substrate and the color value of the area extracted from the reference image data obtained by imaging the reference substrate lacking said specific one film is smaller than a predetermined value.

In a preferred embodiment, the calculating of the difference degree is performed by calculating the Euclidean distance between color values of two color information.

According to a second aspect of the present invention, there is provided a defect inspecting apparatus for inspecting an inspection target substrate on which a plurality of films of different kinds are stacked on layers, said apparatus comprising: a database storing reference data including a plurality of reference image data, which are obtained by imaging a plurality of reference substrates, respectively, wherein each of said reference substrates lacks only one of said plurality of films of different kinds but includes remainder of said plurality of films of different kinds, and wherein in said reference substrates the lacking films are different from each other, and wherein said plurality of reference image data is classified into categories according to the kinds of the films; an imaging unit configured to image an inspection target substrate on which the different kinds of films are stacked on layers, thereby obtaining inspection image data; a defect detecting unit configured to detect whether or not any defect exists on the inspection target substrate based on the inspection image data; a defect information extracting unit configured, if a defect exists, to extract color information, of an area containing the defect, from the inspection image data, as color values represented according to a color system; a reference color information extracting unit configured to extract color information of an area, corresponding to the area where the defect exists in the inspection target substrate, from each of said plurality of reference image data, as color values represented according to said color system; a difference degree calculating unit configured to calculate a difference degree between the color values of the area of the inspection target substrate and the color values of each of the areas of said plurality of reference image data; and a comparing and judging unit configured to judge that a defect exists in one specific film of said plurality of films of different kinds, if the difference degree between the color values of the area of the inspection target substrate and the color value of the area extracted from the reference image data obtained by imaging the reference substrate lacking said specific one film is smaller than a predetermined value.

In one preferred embodiment, the difference degree calculating unit is configured to calculate the Euclidean distance, as the difference degree, between color values of two color information.

According to a third aspect of the present invention, there is provided a computer-readable, storage medium storing a defect inspection program which is to be executed by a computer included in a defect inspecting apparatus comprising a database and an imaging unit configured to image an inspection target substrate on which the different kinds of films are stacked on layers, thereby obtaining inspection image data, wherein the database storing reference data including a plurality of reference image data, which are obtained by imaging a plurality of reference substrates, respectively, wherein each of said reference substrates lacks only one of said plurality of films of different kinds but includes remainder of said plurality of films of different kinds, and wherein in said reference substrates the lacking film are different from each other, and wherein said plurality of reference image data is classified into categories according to the kind of the films, and wherein upon execution of the defect inspection program, the defect inspection program runs the computer to perform as the following functional unit including: a defect detecting unit configured to detect whether or not any defect exists on the inspection target substrate based on the inspection image data; a defect information extracting unit configured, if a defect exists, to extract color information, of an area containing the defect, from the inspection image data as color values represented according to a color system; a reference color information extracting unit configured to extract color information of an area, corresponding to the area where the defect exists in the inspection target substrate, from each of said plurality of reference image data, as color values represented according to said color system; a difference degree calculating unit configured to calculate a difference degree between the color values of the area of the inspection target substrate and the color values of each of the areas of said plurality of reference image data; and a comparing and judging unit configured to judge that a defect exists in one specific film of said plurality of films of different kinds, if the difference degree between the color values of the area of the inspection target substrate and the color value of the area extracted from the reference image data obtained by imaging the reference substrate lacking said specific one film is smaller than a predetermined value.

In one preferred embodiment, the difference degree calculating unit is configured to calculate the Euclidean distance, as the difference degree, between color values of two color information.

According to the present invention, a film having the defect can be identified rapidly. This facilitates analysis of the cause of the defect rapidly, and presents deterioration in productivity.

DESCRIPTION OF PREFERRED EMBODIMENTS

An embodiment of the present invention will be described below with reference to the accompanying drawings. In the present invention, a semiconductor wafer (also referred to simply as "wafer") is an inspection target. The present invention can be suitably employed in an inspecting step before an exposure step or the like, in a photolithographic process included in a semiconductor device manufacturing.

Figure 1:
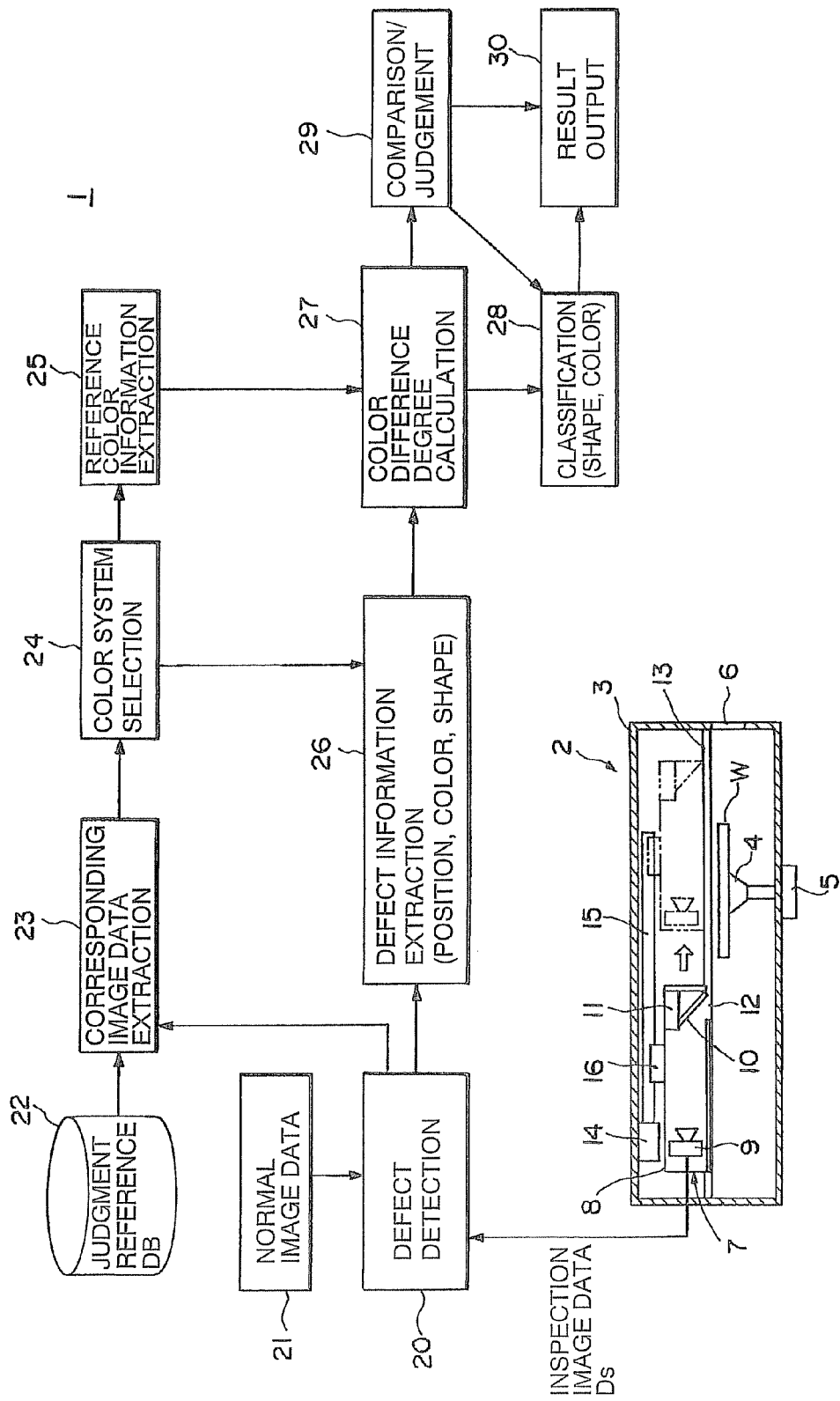
FIG. 1 is a block diagram showing the overall structure of a defect inspecting apparatus according to the present invention.

FIG. 1 is a block diagram showing the overall structure of a defect inspecting apparatus 1 used in this embodiment. The defect inspecting apparatus 1 is particularly configured to detect a defect in a plurality of films (e.g., a base film, a resist film, and a top coat film), which are sequentially stacked on layers on the surface of a wafer W by a photolithographic process, and specifically configured to detect a defect which occurs during formation of the films (e.g., uncoated portion).

In FIG. 1, the defect inspecting apparatus 1 includes an image data acquiring unit 2 that images a two-dimensional image of an inspection target wafer W, thereby obtaining inspection image data Ds. The defect inspecting apparatus 1 further includes a defect detecting unit 20 that compares, by predetermined image-processing, the inspection image data Ds obtained by the image data acquiring unit 2 with normal image data 21 of a wafer which has been normally processed in accordance with a process recipe, so as to detect whether or not any defect exists on the wafer W.

The defect inspecting apparatus 1 further includes a defect data extracting unit 26 that extracts defect data such as a position (area), a color, and a shape of the defect, based on the detection result of the detect detecting unit 20; and a color difference degree calculating unit 27 that calculates a difference degree (e.g., Euclidean distance) between the color information of the defective area, which has been extracted by the defect data extracting unit 26, and color information of reference image data. The defect inspecting apparatus 1 further includes: a comparing/judging unit 29 that identifies a film having the defect (defective film), based on the difference degree calculated by the color difference degree calculating unit 27; a defect classifying unit 28 that classifies the types of the defect (particle, scratch, etc.); and a result output unit 30 that displays an inspection result or the like.

The defect inspecting apparatus 1 includes: a judgment reference database 22 in which the reference image data (instruction data), which are to be used by the color difference degree calculating unit 27, are stored prior to performing of the defect inspection of the wafer W; and a corresponding image data extracting unit 23 that extracts image data of an area, corresponding to the area, of the inspection target wafer W, containing the defect which has been detected by the defect detecting unit 20, from the reference image data of the judgment reference database 22.

The defect inspecting apparatus 1 further includes: a color system selecting unit 24 that selects one of color systems representing the color information by three parameters (color values), such as an RGB color system, an XYZ color system, an xyY color system, an HSV color system, and so on, for color difference degree calculation of the color difference degree calculating unit 27; and a reference color information extracting unit 25 that generates (or converts) and outputs color information according to the color system selected by the color system selecting unit 24, from the image data extracted by the corresponding image data extracting unit 23.

The defect inspecting apparatus 1 is equipped with a computer (not shown). The aforementioned various units including the defect detecting unit 20, the corresponding image data extracting unit 23, the reference color information extracting unit 25, the defect data extracting unit 26, the color difference degree calculating unit 27, the comparing/judging unit 29, and so on are realized by hardwares (a processor, a memory, and so on) of the computer, which function as the respective units, upon execution of a computer program (defect inspecting program) by the computer, the computer program being stored in various kinds of storage media which can be read by the computer.

Next, an example of the structure of the data acquiring unit 2 is described. The data acquiring unit 2 has an imaging unit 7 disposed in an upper interior space of a casing 3. The imaging unit 7 is provided with an imaging device 9, which is accommodated in a cover 8, having a substantially parallelepiped shape, on one end side thereof. In this embodiment, a CCD camera of a wide angle type is used as the imaging device 9. A half mirror 10 is arranged on the other end of the cover 8. An illuminator 11 is arranged behind the half mirror 7. An opening 12 is formed in a lower face of the cover 8 on the other end thereof. Thus, light emitted from the illuminator 11 passes through the half mirror 10, and illuminates via the opening 12 a part below the imaging unit 7. Therefore, a light ray reflected by an object present in the illuminated area is reflected by the half mirror 10 and is taken by the imaging device 9. Namely, the imaging device 9 can image the object located in the illuminated area.

As shown by the arrow shown in FIG. 1, the imaging unit 7 can be linearly moved within the casing 3 of the data acquiring unit 2. In this embodiment, the imaging unit 7 is moved along guide rails 13 disposed on opposite sides of the casing 3. The imaging unit 7 is driven by a drive unit 14 such as a pulse motor. A slider 16 fixed on the cover 8 of the imaging unit 7 is engaged with a drive shaft 15 that is rotated by the drive of the drive unit 14. Thus, similarly to a ball screw mechanism, upon rotation of the drive shaft 15 by the drive unit 14, the imaging unit 7 having the slider 16 is linearly moved within the casing 3 of the data acquiring part 2.

A stage 4 on which a wafer W is placed is disposed on one end side of a lower space in the casing 3. The stage 4 can be rotated and stopped by a rotary drive part 5 such as a motor. The stage 4 has an alignment function. Formed in one end of the casing 3 is a loading/unloading port 6 through which a wafer W is loaded to the stage 4 and unloaded therefrom.

The data acquiring unit 2 as structured above can scan the upper surface of the wafer W on the stage 4 while the imaging unit 7 moves along the guide rails 13 within the upper space of the casing 3, so that the whole upper surface of the wafer W can be imaged by the imaging device 9.

Next, the reference data stored in the judgment reference database 22 is described in detail. Here, it is assumed that a wafer W is subjected to a defect inspection after a base film 31, a resist film 32 and a top coat film 33 have been sequentially stacked on layers on the wafer W as shown in FIG. 2(a), i.e., before exposure. In this case, there are prepared a plurality of reference wafers W covering every possible combination of films wherein only one of all the films to be stacked on an inspection target wafer W is not formed on respective ones of the reference wafers; and the image data of the reference wafers W are prepared as the reference image data.

Figure 2:
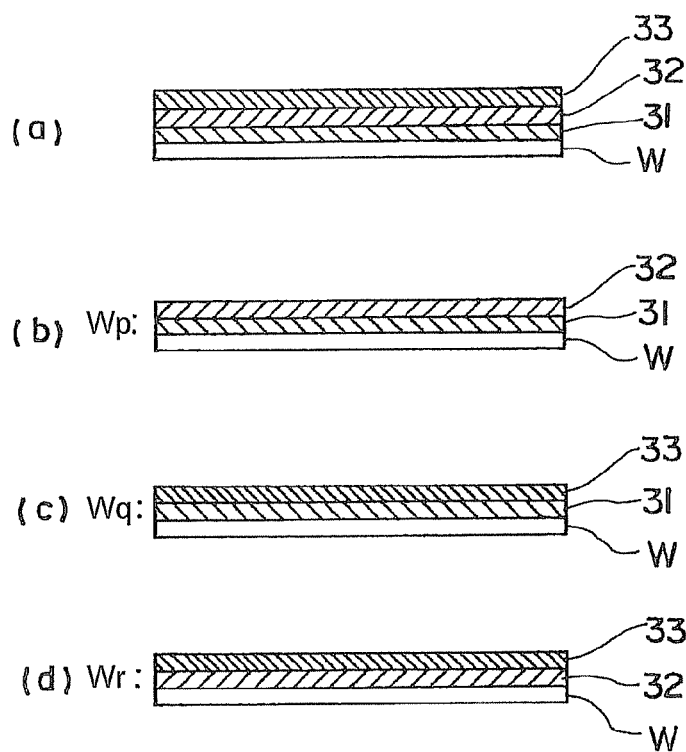
FIG. 2 is shows schematic sectional views for explaining reference data stored in a color judgment database included in the defect inspecting apparatus shown in FIG. 1.
Figure 3:
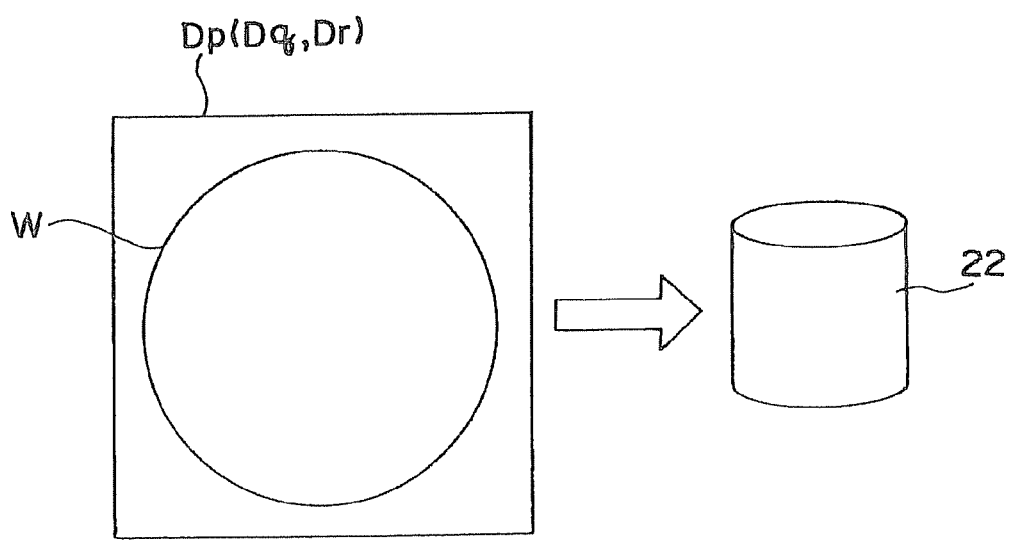
FIG. 3 is an illustration for explaining reference data stored in the color judgment database included in the defect inspecting apparatus shown in FIG. 1.

In detail, prepared as the reference image data are: image data of a reference wafer W (Wp) on which only the top coat film 33 is not formed as shown in FIG. 2(b); image data of a reference wafer W (Wq) on which only the resist film 32 is not formed as shown in FIG. 2(c); and image data of a reference wafer W (Wr) on which only the base film 31 is not formed as shown in FIG. 2(d). It should be noted that, in the following description, a suffix "P" or "p" is affixed to the reference wafer W on which only the top coat film 33 is not formed, and data relating to the wafer. A suffix "Q" or "q" is affixed to the reference wafer W on which only the resist film 32 is not formed, and data relating to the wafer. A suffix "R" or "r" is affixed to the reference wafer W on which only the base film 31 is not formed, and data relating the wafer. As shown in FIG. 3, image data Dp, Dq, Dr of the reference wafers Wp, Wq, Wr are used as the reference image data, are previously classified into categories according to the kind of the lacking film (i.e., the kind of a film not formed on a wafer), and are stored in the judgment reference database 22, before the defect inspection is performed.

Next, the flow of a defect inspecting method performed by the defect inspecting apparatus 1 is described with reference to FIGS. 4 and 5. In the judgment reference database 22 shown in FIG. 1, the image data Dp, Dq and Dr of the reference wafers Wp, Wq and Wr, which are explained with reference to FIGS. 2 and 3, are stored beforehand.

At first, an inspection target wafer W (Ws) is placed on the stage 4 in the data acquiring unit 2. After a predetermined alignment is performed, the imaging unit 7 is moved, and then the wafer W is imaged by the imaging device 9 in the imaging unit 7 (step S1 in FIG. 4). Thus, as shown in FIG. 5, inspection image data Ds is obtained. A suffix "S" or "s" is affixed to the inspection target wafer W (Ws), and data obtained from the wafer.

Figure 4:
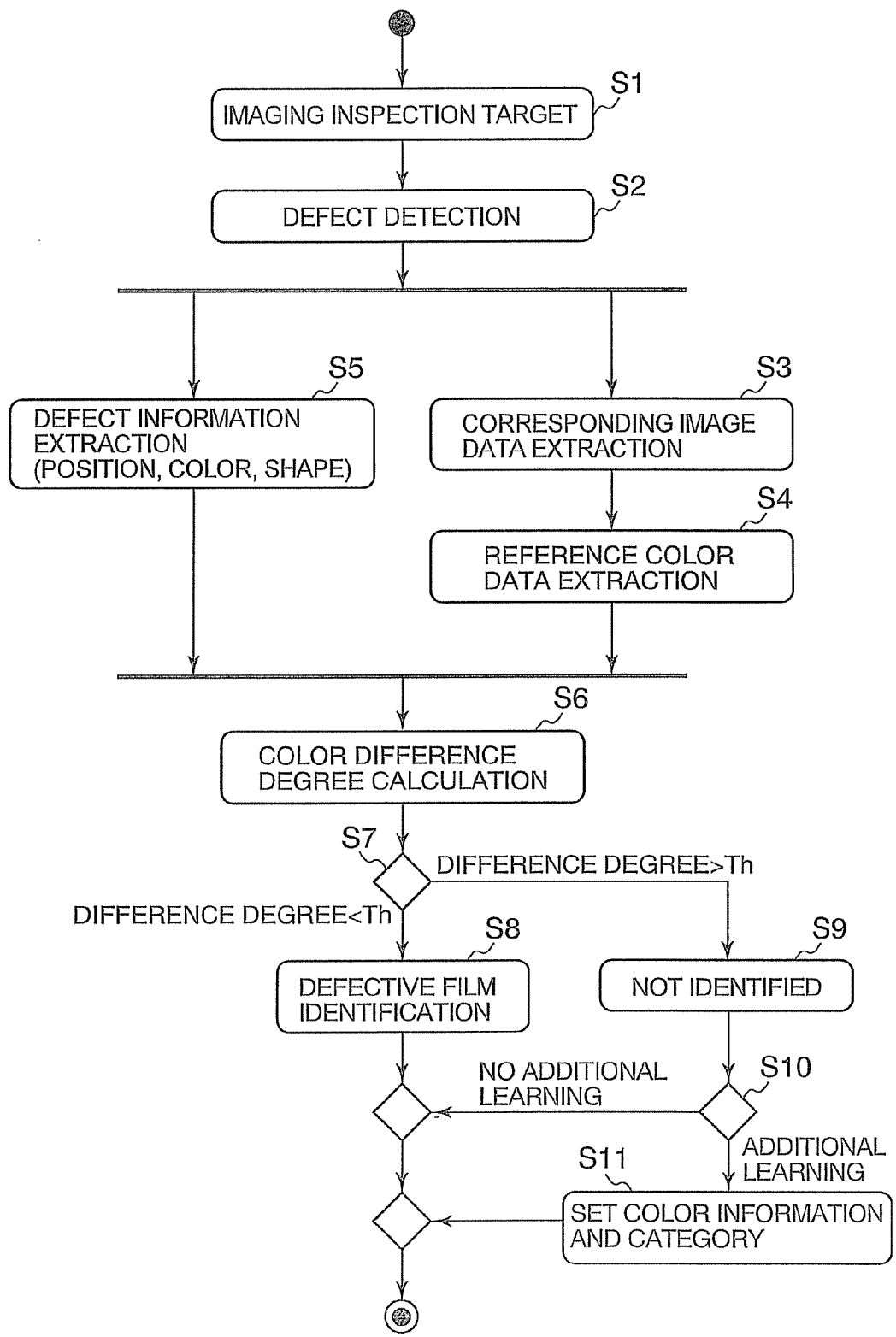
FIG. 4 is an activity diagram for explaining the flow of a defect inspecting method performed by the defect inspecting apparatus shown in FIG. 1.

The defect detecting unit 20 compares, by a predetermined image-processing, the inspection image data Ds of the inspection target wafer Ws with the normal image data prepared beforehand by imaging a wafer free of defect, thereby to detect whether or not any defect exists on the inspection target wafer Ws (step S2 in FIG. 4). As shown in FIG. 5, if a defect 40 (e.g., an uncoated portion due to scratching) exists, the inspection image data Ds is sent to the corresponding image data extracting unit 23 and the defect data extracting unit 26.

Figure 5:
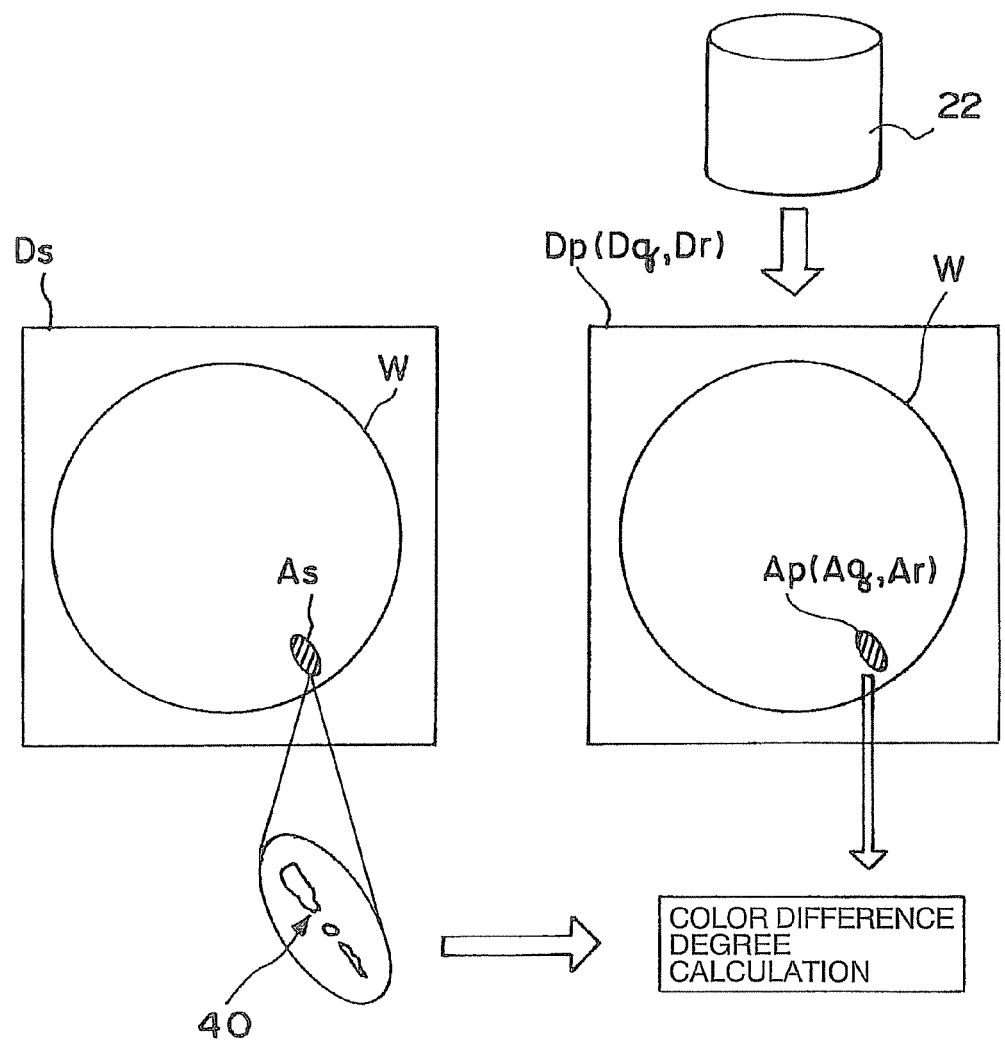
FIG. 5 is an illustration for explaining extraction of a defective area and calculation of difference degree of color information in the defect inspecting method performed by the defect inspecting apparatus shown in FIG. 1.
Figure 6:
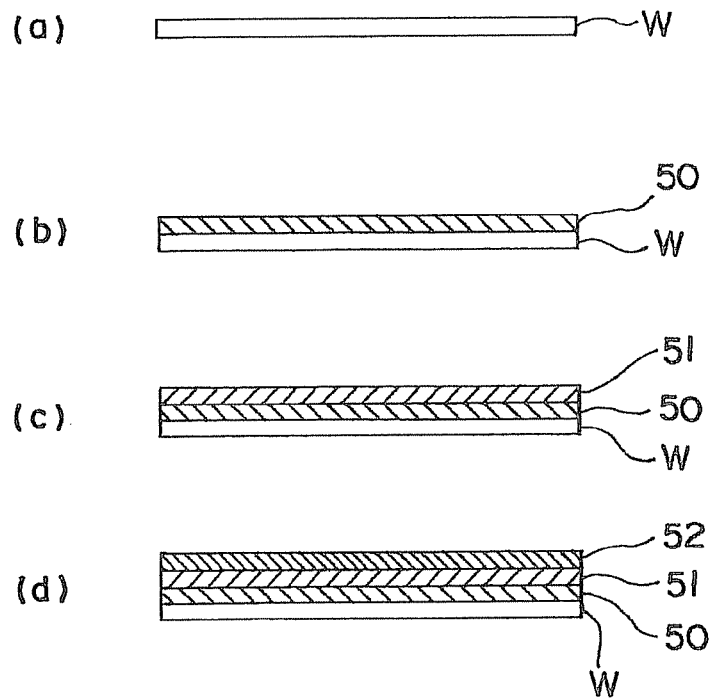
FIG. 6 shows schematic sectional views for explaining films that are stacked on layers on a wafer.
Figure 7:
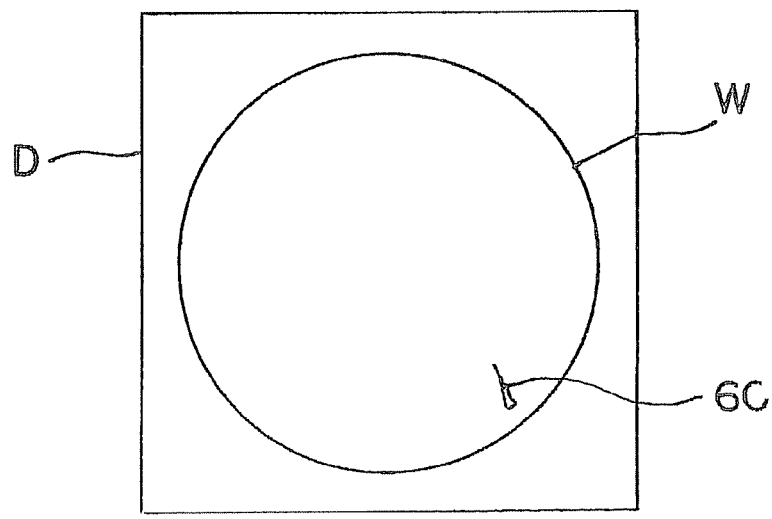
FIG. 7 is an illustration for explaining a conventional macro defect inspection.

Based on the inspection image data Ds sent from the defect detecting unit 20, as shown in FIG. 5, the corresponding image data extracting unit 23 extracts image data of areas Ap, Aq and Ar, which correspond to an area As of the inspection target wafer Ws in which the defect 40 exists, from the respective reference image data Dp, Dq and Dr stored in the judgment reference database 22 (step S3 in FIG. 4).

Following thereto, the color system selecting unit 24 selects a color system (e.g., RGB color system), and the color information extracting unit 25 extracts reference color information $P(x_{p1}, y_{p1}, z_{p1})$, $Q(x_{q1}, y_{q1}, z_{q1})$, $R(x_{r1}, y_{r1}, z_{r1})$, each represented by three color values, from the respective extracted areas Ap, Aq and Ar (step S4 in FIG. 4).

On the other hand, according to the selected color system, the defect data extracting unit 26 extracts color information $(x_2, y_2, z_2)$ of the defective area, from the inspection image data Ds (step S5 of FIG. 4).

The color difference degree calculating unit 27 calculates according to Expression (1) the Euclidean distance as a difference degree $\Delta$ ($\Delta p$, $\Delta q$, $\Delta r$) between the respective reference color information obtained from the reference image data and the color information obtained from the inspection target wafer Ws (step S6 in FIG. 4). In Expression (1), ($w_x$, $w_y$, $w_z$) are weighting factors which have been respectively set in advance.

$$\Delta = \sqrt{w_s(x_2-x_1)^2 + w_y(y_2-y_1)^2 + w_z(z_2-z_1)^2} \quad \text{Expression 1}$$

More specifically, the color difference degrees $\Delta p$, $\Delta q$, $\Delta r$ are calculated by the following Expressions (2), (3) and (4).

$$\Delta p = \sqrt{w_s(x_2-x_{p1})^2 + w_y(y_2-y_{p1})^2 + w_z(z_2-z_{p1})^2} \quad \text{Expression 2}$$

$$\Delta q = \sqrt{w_s(x_2-x_{q1})^2 + w_y(y_2-y_{q1})^2 + w_z(z_2-z_{q1})^2} \quad \text{Expression 3}$$

$$\Delta r = \sqrt{w_s(x_2-x_{r1})^2 + w_y(y_2-y_{r1})^2 + w_z(z_2-z_{r1})^2} \quad \text{Expression 4}$$

Thereafter, the comparing/judging unit 29 compares the respective color difference degrees $\Delta p$, $\Delta q$ and $\Delta r$, which have been calculated by the color difference degree calculating unit 27, with a previously set threshold value Th (step S7 in FIG. 4). Then, the comparing/judging unit 29 identifies, among the respective color difference degrees $\Delta p$, $\Delta q$ and $\Delta r$, one that is smaller than the threshold value Th (step S8 in FIG. 4).

The fact that a color difference degree of the inspection target wafer Ws with respect to one of the reference wafers (Wp, Wq or Wr) is smaller than the threshold value Th (i.e., the color characteristics are essentially the same) means that the film stacking condition of the inspection target wafer in the area containing the defect 40 (e.g., uncoated portion) is essentially the same as that of the one reference wafer lacking one of the films. Thus, it can be judged that the inspection target wafer has a defective film which is the same kind as that is not formed on the reference wafer having the color difference degree ($\Delta p$, $\Delta q$ or $\Delta r$) smaller than the threshold value Th.

If all the respective color difference degrees $\Delta p$, $\Delta q$ and $\Delta r$ are not less than the threshold value Th, it is judge that none of the top coat film 33, the resist film 32 and the base film 31 has the defect, and the defective film identification result is "Not Identified" (step S9 in FIG. 4).

Table 1 shows a concrete example in which the threshold value Th is set to "4". In the case of the inspection target wafer W1, since the color difference degree between the defective area of the wafer W1 and corresponding area of the reference wafer Wp is "1", it is judged that the defect exists in the top coat film which is not formed on the reference wafer Wp. In the case of the inspection target wafer W2, since the color difference degree between the defective area of the wafer W2 and the corresponding area of the reference wafer Wq is "2", it is judged that the defect exits in the resist film which is not formed on the reference wafer Wq. In the cases of the inspection target wafers W3 and W4, since all the color difference degrees are larger than the threshold value Th, it is judged that the defect occurs in none of the films, and the defective film identification result is "Not Identified". In the case of the inspection target wafer W5, since the color difference degree between the defective area of the wafer W and the corresponding area of the reference wafer Wp is "2", it is judged that the defect exists in the top coat film which is not formed on the reference wafer Wp.

TABLE 1

| | Difference Degree from References | | | Judgment Result | |
|---|---|---|---|---|---|
| Inspection Target | Wp (No Top Coat Film) | Wq (No Resist Film) | Wr (No Base Film) | difference degree < Th = 4 | Defect Type |
| Wafer W1 | 1 | 12 | 5 | Defect in Top Coat | Poor Coat |
| Wafer W2 | 11 | 2 | 7 | Defect in Resist | Poor Coat |
| Wafer W3 | 11 | 7 | 6 | Not Identified | Poor Coat |
| Wafer W4 | 12 | 8 | 5 | Not Identified | Scratch |
| Wafer W5 | 2 | 11 | 5 | Defect in Top Coat | Not Classified |

The thus obtained defective film identification result, together with the defect type classifying result (see, Table 1) by the defect classifying unit 28, is outputted to the result output unit 30 (such as a display).

In the defect type classified by the defect classifying unit 28 shown in Table 1, "poor coat" means a defect by a coating step (coating failure), and "scratch" means a defect caused by a scratch damage. The type of the defect can be determined based on shape information thereof.

As in the step 9 in FIG. 4, when the defective film identification result is "Not Identified" (see wafers W3 and W4 in Table 1), the defect types thereof are respectively judged as "poor coat" and "scratch" by the defect classifying unit 28.

In this case, the reason why the defective film cannot be identified may be considered that the judgment reference database 22 has not learned sufficient reference data. That is, the defect pattern in the inspection target wafer is not of any one of the types which are present in the reference wafer Wp (lacking only the top coat film 33), the reference wafer Wq (lacking only the resist film 32) and the reference wafer Wq (lacking only the base film 31). In this case, for example, it is preferable that the user studies the image data of the inspection target wafer W (step S10 in FIG. 4). If the user considers that the cause of the defect is likely to be estimated based on his/her past experience, the defect information is preferably added to the judgment reference database 22, as reference data (instruction data) of a new defect category (step S11 in FIG. 4). In this manner, by accumulating reference data in the judgment reference database 22, a defect cause can be more reliably and rapidly specified.

As described above, according to the foregoing embodiment, in the defect inspection of a wafer on which plural kinds of films are stacked on layers, color information extracted from a defective area (e.g., uncoated portion due to coating failure) of an inspection target wafer, and color information of an area corresponding to the defective area, which is extracted from image data of reference wafers on which only a certain film is not formed, the image data having been previously stored in the judgment reference database 22, are compared. Then, when a color difference degree therebetween is smaller than a predetermined threshold value Th, it is judged that the defect exists on a film which is not present in the reference wafer. Thus, the defective film can be identified, the cause of the defect can be rapidly analyzed, whereby the cause can be suitably eliminated. Accordingly, deterioration in productivity can be prevented.

Given herein as an example to describe the embodiment is a case where the substrate (wafer W) on which three kinds of films are stacked on layers is subjected to the defect inspection. However, in the defect inspecting method and the defect inspecting apparatus according to the present invention, the number of films stacked on the substrate is not limited thereto.

Moreover, instead of a semiconductor wafer, the inspection target substrate may be a glass substrate used in a flat display panel or the like.

The invention claimed is:

1. A detect inspecting method of inspecting an inspection target substrate on which a plurality of films of different kinds are stacked on layers, said method comprising:
   providing a database storing reference data including a plurality of reference image data, which are obtained by imaging a plurality of reference substrates, respectively, wherein each of said reference substrates lacks only one of said plurality of films of different kinds but includes remainder of said plurality of films of different kinds, and wherein in said reference substrates the lacking films are different from each other, and wherein said plurality of reference image data is classified into categories according to the kinds of the films;
   imaging an inspection target substrate on which the different kinds of films are stacked on layers, thereby obtaining inspection image data;
   detecting whether or not any defect exists on the inspection target substrate based on the inspection image data;
   if a defect exists, extracting color information, of an area containing the defect, from the inspection image data, as color values represented according to a color system;
   extracting color information of an area, corresponding to the area where the defect exists in the inspection target substrate, from each of said plurality of reference image data, as color values represented according to said color system;
   calculating a difference degree between the color values of the area of the inspection target substrate and the color values of each of the areas of said plurality of reference image data; and
   judging that a defect exists in one specific film of said plurality of films of different kinds, if the difference degree between the color values of the area of the inspection target substrate and the color value of the area extracted from the reference image data obtained by imaging the reference substrate lacking said specific one film is smaller than a predetermined value.

2. The method according to claim 1, wherein the calculating of the difference degree is performed by calculating a Euclidean distance between color values of two color information.

3. A defect inspecting apparatus for inspecting an inspection target substrate on which a plurality of films of different kinds are stacked on layers, said apparatus comprising:
   a database storing reference data including a plurality of reference image data, which are obtained by imaging a plurality of reference substrates, respectively, wherein each of said reference substrates lacks only one of said plurality of films of different kinds but includes remainder of said plurality of films of different kinds, and wherein in said reference substrates the lacking films are different from each other, and wherein said plurality of reference image data is classified into categories according to the kinds of the films;
   an imaging unit configured to image an inspection target substrate on which the different kinds of films are stacked on layers, thereby obtaining inspection image data;
   a defect detecting unit configured to detect whether or not any defect exists on the inspection target substrate based on the inspection image data;
   a defect information extracting unit configured, if a defect exists, to extract color information, of an area containing the defect, from the inspection image data, as color values represented according to a color system;
   a reference color information extracting unit configured to extract color information of an area, corresponding to the area where the defect exists in the inspection target substrate, from each of said plurality of reference image data, as color values represented according to said color system;
   a difference degree calculating unit configured to calculate a difference degree between the color values of the area of the inspection target substrate and the color values of each of the areas of said plurality of reference image data; and
   a comparing and judging unit configured to judge that a defect exists in one specific film of said plurality of films of different kinds, if the difference degree between the color values of the area of the inspection target substrate and the color value of the area extracted from the reference image data obtained by imaging the reference substrate lacking said specific one film is smaller than a predetermined value.

4. The method according to claim 3, wherein the difference degree calculating unit is configured to calculate a Euclidean distance, as the difference degree, between color values of two color information.

5. A computer-readable storage medium storing a defect inspection program which is to be executed by a computer included in a defect inspecting apparatus comprising a database and an imaging unit configured to image an inspection target substrate on which the different kinds of films are stacked on layers, thereby obtaining inspection image data, wherein the database storing reference data including a plurality of reference image data, which are obtained by imaging a plurality of reference substrates, respectively, wherein each of said reference substrates lacks only one of said plurality of films of different kinds but includes remainder of said plurality of films of different kinds, and wherein in said reference substrates the lacking film are different from each other, and wherein said plurality of reference image data is classified into categories according to the kind of the films, and wherein upon execution of the defect inspection program, the defect inspection program runs the computer to perform as the following functional unit including:
   a defect detecting unit configured to detect whether or not any defect exists on the inspection target substrate based on the inspection image data;
   a defect information extracting unit configured, if a defect exists, to extract color information, of an area containing the defect, from the inspection image data as color values represented according to a color system;

a reference color information extracting unit configured to extract color information of an area, corresponding to the area where the defect exists in the inspection target substrate, from each of said plurality of reference image data, as color values represented according to said color system;

a difference degree calculating unit configured to calculate a difference degree between the color values of the area of the inspection target substrate and the color values of each of the areas of said plurality of reference image data; and a comparing and judging unit configured to judge that a defect exists in one specific film of said plurality of films of different kinds, if the difference degree between the color values of the area of the inspection target substrate and the color value of the area extracted from the reference image data obtained by imaging the reference substrate lacking said specific one film is smaller than a predetermined value.

6. The computer-readable storage medium according to claim 5, wherein the difference degree calculating unit is configured to calculate a Euclidean distance, as the difference degree, between color values of two color information.

* * * * *